(12) United States Patent
Slutsky

(10) Patent No.: US 9,483,669 B2
(45) Date of Patent: Nov. 1, 2016

(54) BARCODE IMAGING WORKSTATION HAVING SEQUENTIALLY ACTIVATED OBJECT SENSORS

(71) Applicant: SYMBOL TECHNOLOGIES, INC., Schaumburg, IL (US)

(72) Inventor: Michael S Slutsky, Stony Brook, NY (US)

(73) Assignee: Symbol Technologies, LLC, Holtsville, NY (US)

(*) Notice: Subject to any disclaimer, the term of this patent is extended or adjusted under 35 U.S.C. 154(b) by 45 days.

(21) Appl. No.: 14/265,483

(22) Filed: Apr. 30, 2014

(65) Prior Publication Data

US 2015/0317499 A1 Nov. 5, 2015

(51) Int. Cl.
*G06K 7/14* (2006.01)
*G06K 7/01* (2006.01)
*G06K 7/10* (2006.01)

(52) U.S. Cl.
CPC .............. *G06K 7/01* (2013.01); *G06K 7/1096* (2013.01); *G06K 7/1404* (2013.01); *G06K 2207/1012* (2013.01)

(58) Field of Classification Search
CPC .... G06K 7/01; G06K 7/1096; G06K 7/1404; G06K 2207/1012
USPC .................................................. 235/435–486
See application file for complete search history.

(56) References Cited

U.S. PATENT DOCUMENTS

| | | | |
|---|---|---|---|
| 7,540,423 B2 | 6/2009 | Harris | |
| 7,611,063 B2 | 11/2009 | Wilz, Sr. et al. | |
| 8,368,663 B2 | 2/2013 | Izadi et al. | |
| 2003/0098349 A1 | 5/2003 | Tsikos et al. | |
| 2006/0197840 A1 | 9/2006 | Neal et al. | |
| 2012/0019165 A1* | 1/2012 | Igaki ...................... G08C 17/02 315/294 |
| 2012/0318869 A1* | 12/2012 | Edmonds ........... G06K 7/10554 235/462.14 |
| 2013/0141584 A1 | 6/2013 | Wittenberg et al. | |

FOREIGN PATENT DOCUMENTS

| | | |
|---|---|---|
| EP | 690401 A2 | 1/1996 |
| WO | 2011041125 A1 | 4/2011 |
| WO | 2014107431 A1 | 7/2014 |

OTHER PUBLICATIONS

International Search Report and Written Opinion mailed Jul. 6, 2015 in counterpart PCT application PCT/US2015/026823.

* cited by examiner

*Primary Examiner* — Renee Chavez

(57) ABSTRACT

A workstation includes a proximity system having multiple object sensors each associated with an object field of view for detecting a target object outside the housing. Each object sensor includes an IR emitter for emitting IR light into an IR emission field and an IR sensor for sensing returned IR light within an IR detection field that intersects the IR emission field. The workstation also includes a controller is operatively connected to the proximity system for activating each one of the multiple object sensors sequentially.

17 Claims, 15 Drawing Sheets

BARCODE IMAGING WORKSTATION HAVING SEQUENTIALLY ACTIVATED OBJECT SENSORS

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

Imaging-based bar code readers may be portable or stationary. A portable bar code reader is one that is adapted to be held in a user's hand and moved with respect to target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to be swiped.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
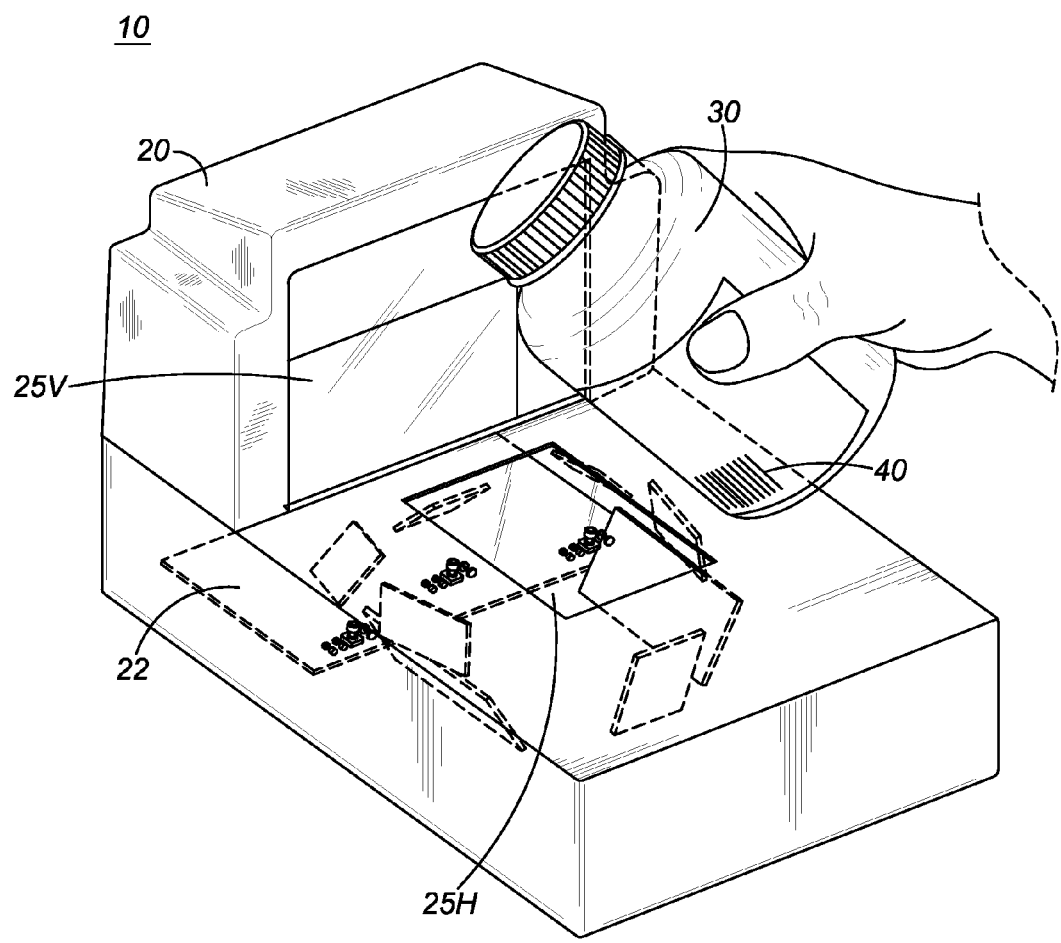
FIG. 1 depicts a workstation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus includes a housing, an imaging sensor within the housing, a proximity system, an illumination system, and a controller. The housing has a first window in an upright plane and a second window in a generally horizontal plane that intersects the upright plane. The imaging sensor has an array of photosensitive elements. The proximity system includes multiple object sensors each associated with an object field of view for detecting a target object outside the housing. Each object sensor includes an infrared (IR) emitter for emitting IR light into an IR emission field and an IR sensor for sensing returned IR light within an IR detection field that intersects the IR emission field. The illumination system is supported by the housing and operative for illuminating the target object with illumination light. The controller is operatively connected to the imaging sensor, the illumination system and the proximity system, for energizing the illumination system in response to detection of the target object in one of the object field of view associated with the multiple object sensors and processing the illumination light returned from the target object and being captured in a field of view associated with the imaging sensor. The controller is further operative for activating each one of the multiple object sensors sequentially. Here, activating an object sensor comprises activating the IR emitter in the activated object sensor and detecting returned IR light caused by the IR emitter with the IR sensor in the activated object sensor.

FIG. 1 depicts a workstation 10 in accordance with some embodiments. The workstation 10 is stationary and includes a housing 20. The housing 20 has a generally horizontal window 25H and a generally vertical window 25V. In one implementing, the housing 20 can be integrated into the sales counter of a point-of-transaction system. The point-of-transaction system can also includes a cash register 48, a touch screen visual display, a printer for generating sales receipts, or other type user interface. The workstation often includes weighing scale 46 incorporated within the housing 20. A horizontal platter 26 is coupled with the weighing scale 46 for weighing a product placed on the horizontal platter 26. The workstation 10 can be used by retailers to process transactions involving the purchase of products bearing an identifying target, such as UPC symbols.

In accordance with one use, an operator can slide or swipe the product 30 past one of the windows (e.g., 25H or 25V) from right to left, or from left to right, in a "swipe" mode, to let an image of the barcode 40 on the product 30 be captured by the workstation 10. Alternatively, the operator can present the barcode 40 on the product 30 to the center of the vertical window 25V in a "presentation" mode. The choice depends on operator preference or on the layout of the workstation. Upon a successful reading of the target bar code, a visual and/or audible signal will be generated by the workstation 10 to indicate to the user that the barcode 40 has been successfully imaged and decoded.

Figure 2A:
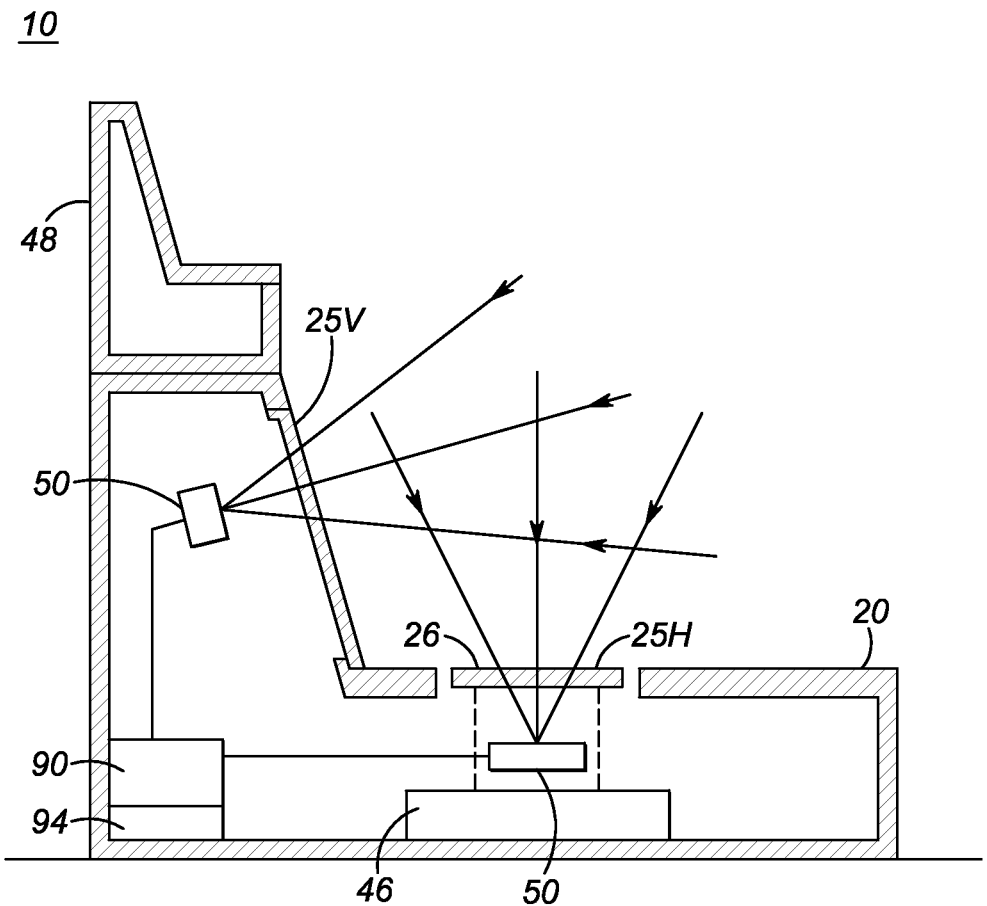
FIG. 2A is a schematic of a multi-planer workstation that includes a plurality of solid-state imagers in accordance with some embodiments.
Figure 2B:
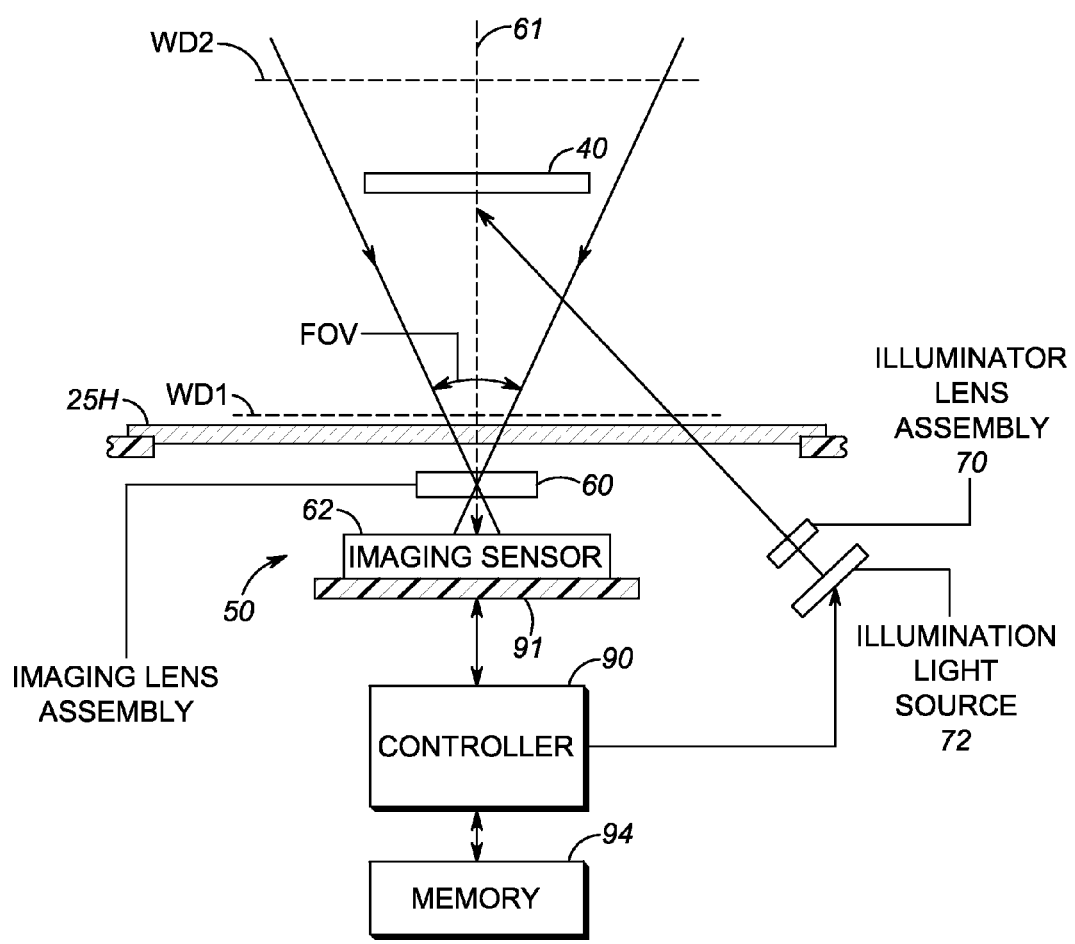
FIG. 2B is a schematic of an imaging scanner in accordance with some embodiments.

As schematically shown in FIG. 2A, a plurality of imaging scanners 50 are mounted at the workstation 10, for capturing light passing through either or both windows from a target which can be a one- or two-dimensional symbol, such as a two-dimensional symbol on a driver's license, or any document, as described below. FIG. 2B is a schematic of an imaging scanner 50 in accordance with some embodiments. The imaging scanner 50 in FIG. 2B includes the following components: (1) an imaging sensor 62 positioned behind an imaging lens arrangement 60; (2) an illuminating lens arrangement 70 positioned in front of an illumination light source 72; and (3) a controller 90.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 25H (or 25V). Generally, the imaging sensor 62 and the imaging lens arrangement 60 are designed to operate together for capturing light scattered or reflected from a barcode 40 as image data over a two-dimensional imaging field of view (FOV). The barcode 40 generally can be located anywhere in a working range of distances between a close-in working distance (WD1) and a far-out working distance (WD2).

In FIG. 2B, the illuminating lens arrangement 70 and the illumination light source 72 are designed to operate together for generating an illuminating light towards the barcode 40 during an illumination time period. The illumination light source 72 can include one or more light emitting diodes (LED). The illumination light source 72 can also include a laser or other kind of light sources.

In FIG. 2B, the controller 90, such as a microprocessor, is operatively connected to the imaging sensor 62 and the illumination light source 72 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination light source 72 for a predetermined illumination time period. The controller 90 then exposes the imaging sensor 62 to capture an image of the barcode 40. The captured image of the barcode 40 is transferred to the controller 90 as image data. Such image data is digitally processed by the decoder in the controller 90 to decode the barcode. The information obtained from decoding the barcode 40 is then stored in the memory 94 or sent to other devices for further processing.

The illumination light source 72 usually is energized to address low ambient light conditions and to minimize hand jitter impact or swiping objects though the FOV on reading performance. On the other hand having bright illumination of an imaging scanner in constantly on state is annoying and bothersome for the user. It is also not efficient from power management perspective. Therefore it is beneficial to have an object sensing system which energizes illumination system only if the object of interest is presented within the predetermined FOV of the imaging scanner and at a certain distance from the scanner. The object detecting system usually includes an infrared LED and a photodetector. When an object is presence in an object field of view of the object detecting system, light projected upon such object will be reflected and scattered back towards the object detecting system, and the reflected and scattered light will be detected by the photodetector of the object detecting system.

As previously stated, FIG. 2A is only a schematic representation of an all imager-based workstation as embodied in a bi-optical workstation with two windows. The workstation can have other kinds of housings with different shapes. The workstation can have one window, two windows, or with more than two windows. In some embodiments, the workstation can include between three to six solid-state imagers. The bi-optical workstation can also include more than six solid-state imagers.

A bi-optical workstation often have multiple subfields of views each provides optimum visibility of a target barcode on the various sides of the product 30 being passed through the scan zone. For examples, FIGS. 3A-3F shows bi-optical workstation that has six subfields of views in accordance with some embodiments. The six subfields are oriented to be most effective for reading indicia on products oriented in the most common ways presented to the workstation by users. The six subfields provide redundant coverage for the indicia located in common positions on the products, thereby assuring maximum performance when used by typical users.

Figure 3A:
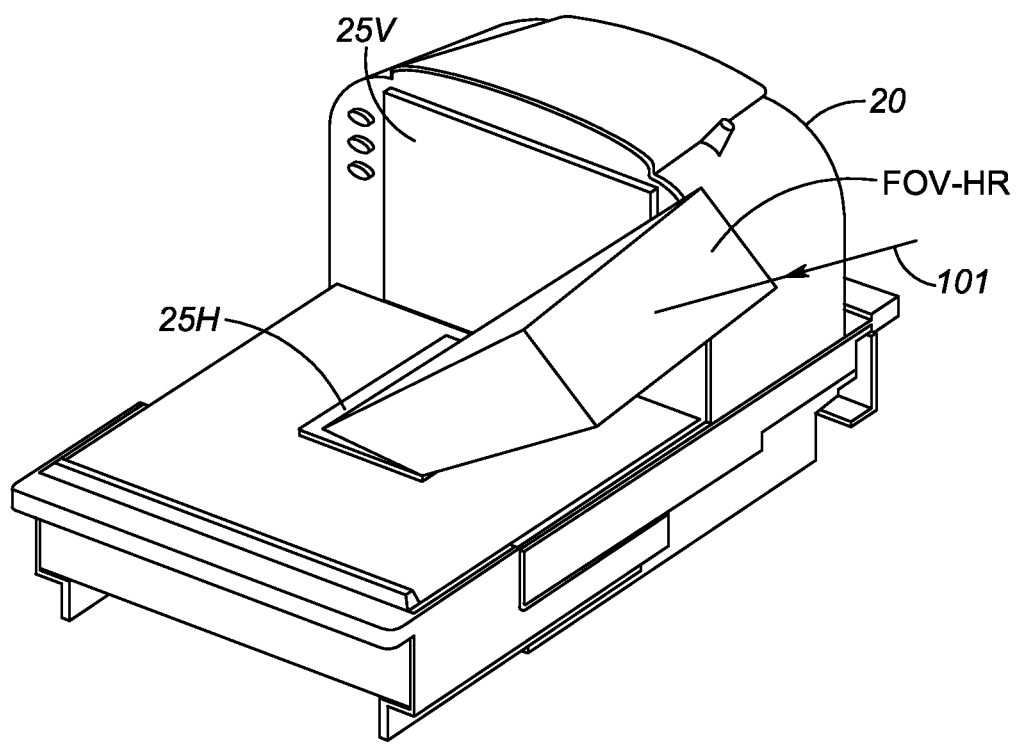
FIGS. 3A-3F shows bi-optical workstation that has six subfields of views in accordance with some embodiments.
Figure 3B:
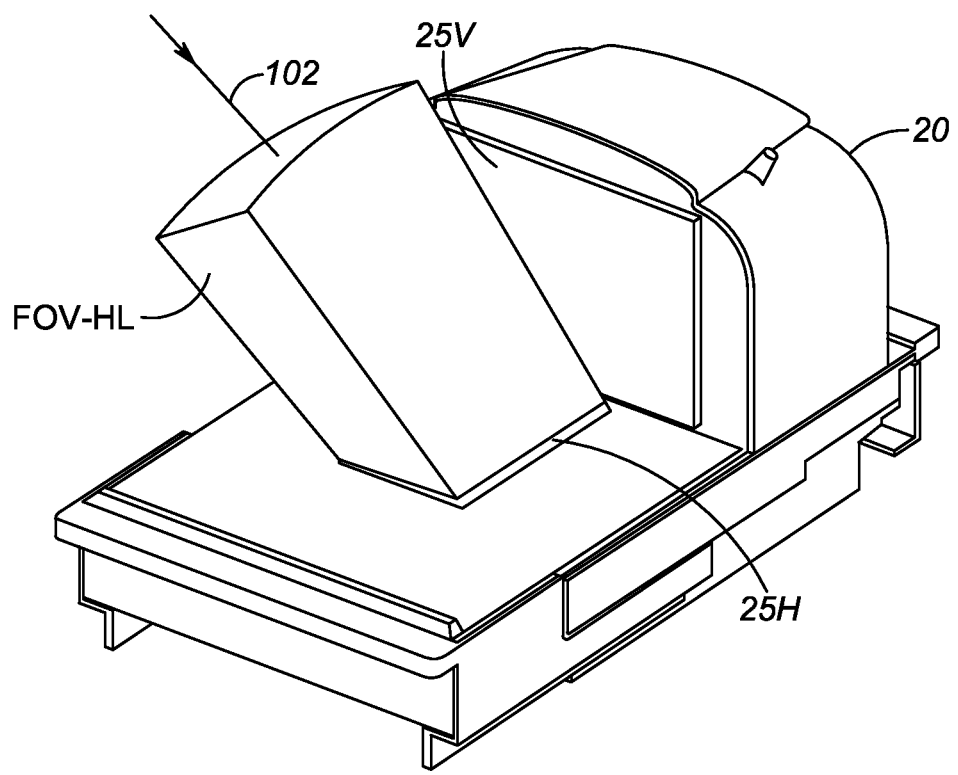
Figure 3C:
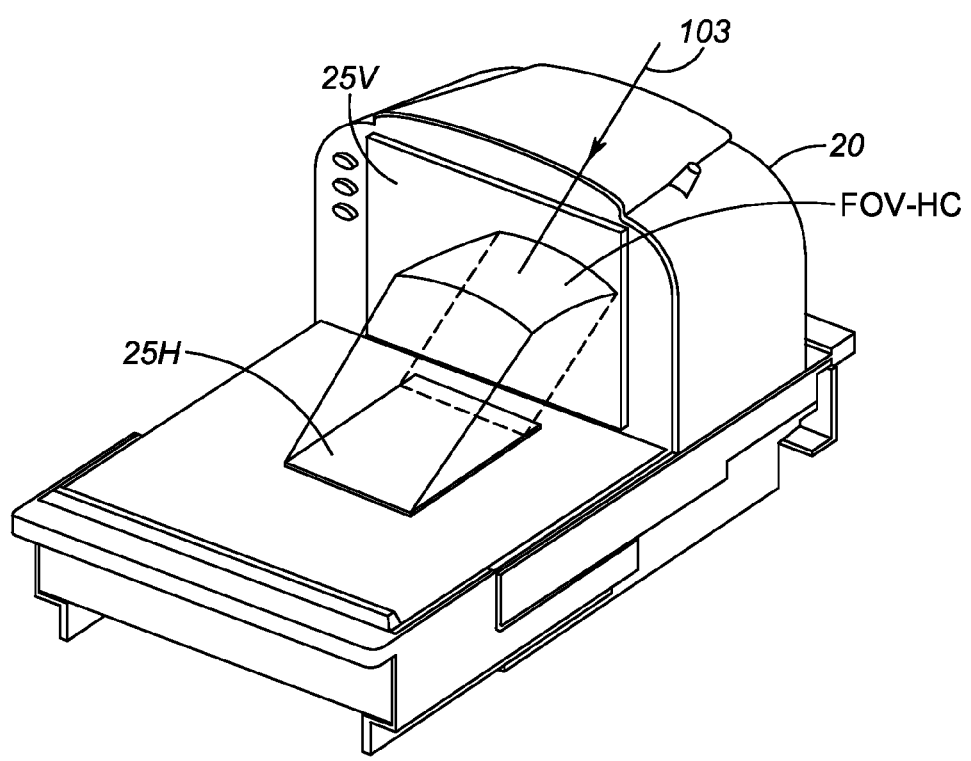

As shown in FIGS. 3A-3C, light ray 101 entering subfield FOV-HR, light ray 102 entering subfield FOV-HL, and light ray 103 entering subfield FOV-HC all passé through the horizontal window 25H and are detected by one or more solid-state imagers. In some implementations, three solid-state imagers are used, and light ray entering each one of the subfields (i.e. subfield FOV-HR, subfield FOV-HL, and subfield FOV-HC) is detected by one of the solid-state imagers. In other implementations, a single solid-state imager is used, and light ray entering each one of the subfields (i.e. subfield FOV-HR, subfield FOV-HL, and subfield FOV-HC) are all detected by this single solid-state imager when the field of view of this ingle solid-state imager is spitted into three subfields with multiple mirrors.

Figure 3D:
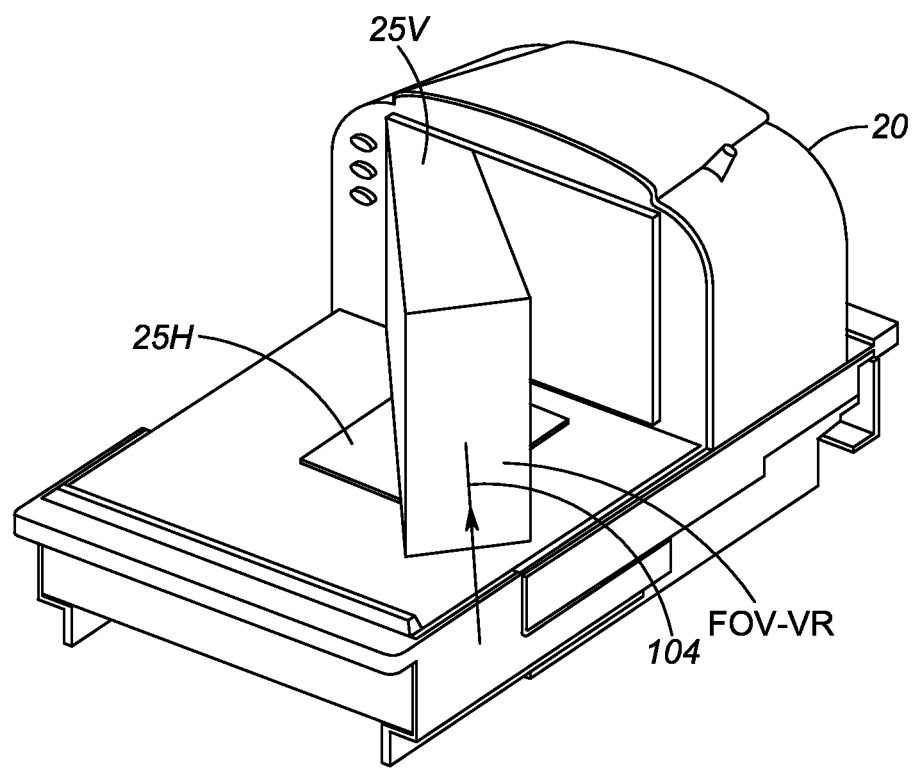
Figure 3E:
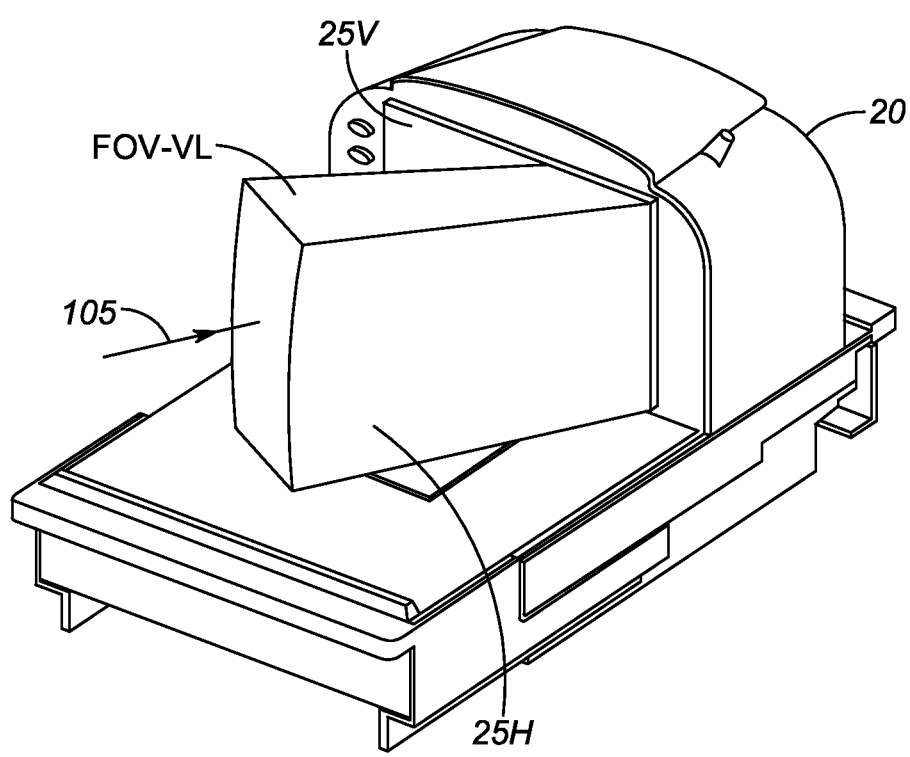
Figure 3F:
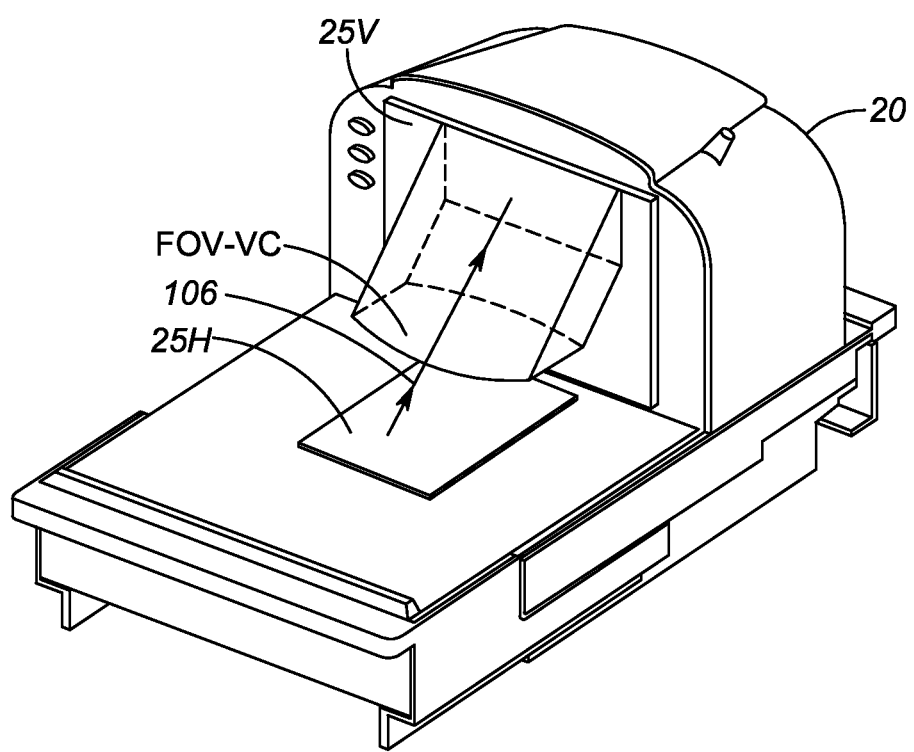

Similarly, As shown in FIGS. 3D-3F, light ray 104 entering subfield FOV-VR, light ray 105 entering subfield FOV-VL, and light ray 106 entering subfield FOV-VC all passé through the vertical window 25V and are detected by one or more solid-state imagers. In some implementations, three solid-state imagers are, and light ray entering each one of the subfields (i.e. subfield FOV-VR, subfield FOV-VL, and subfield FOV-VC) is detected by one of the solid-state imagers. In other implementations, a single solid-state imager is used, and light ray entering each one of the subfields (i.e. subfield FOV-VR, subfield FOV-VL, and subfield FOV-VC) are all detected by this ingle solid-state imager when the field of view of this single solid-state imager is spitted into three subfields with multiple mirrors.

Figure 4A:
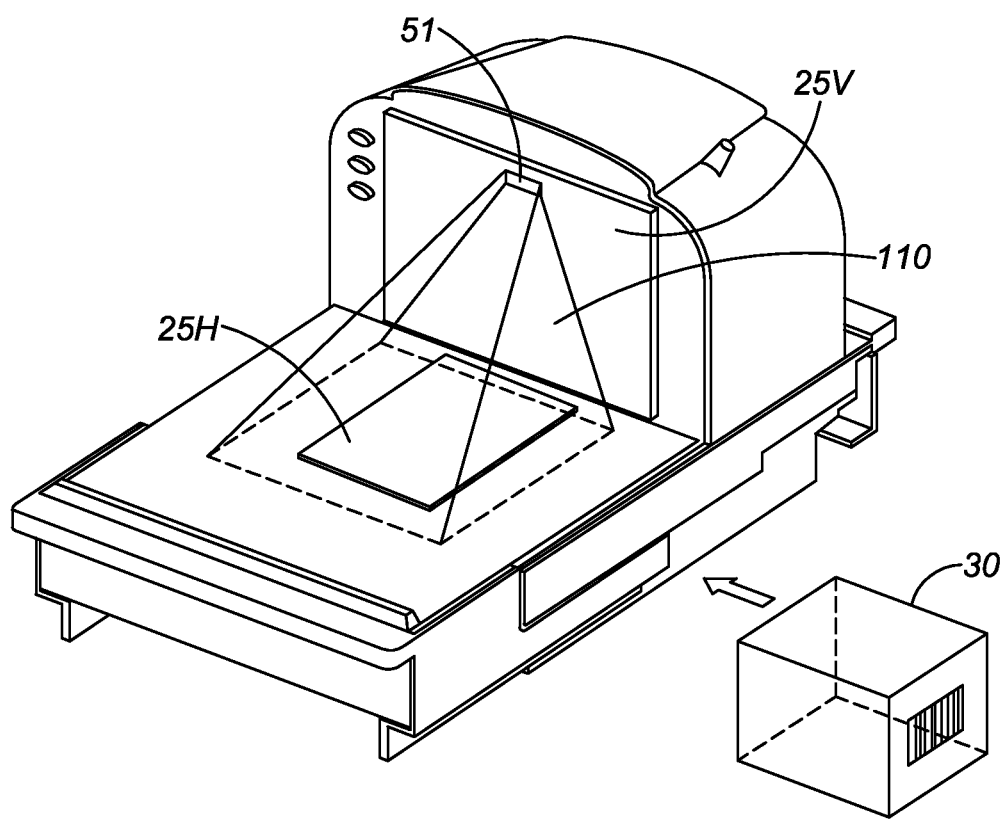
FIG. 4A and FIG. 4B depict a workstation that includes an object sensor S1 in accordance with some embodiments.
Figure 4B:
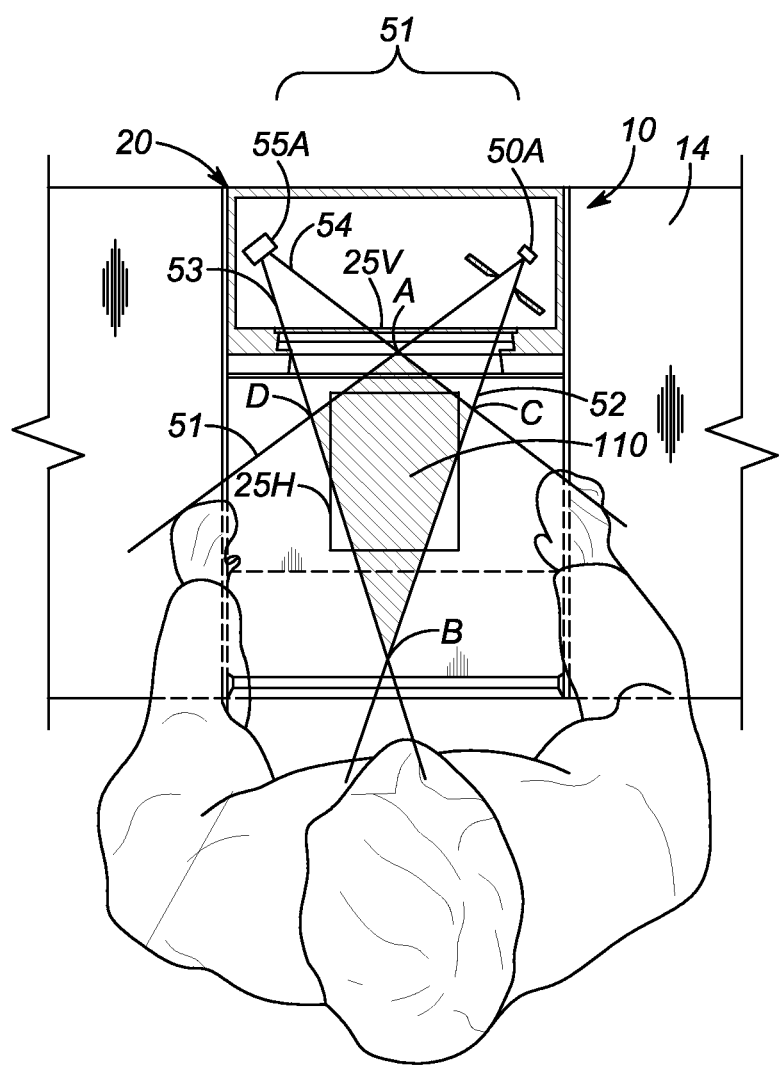

FIG. 4A and FIG. 4B depict a workstation that includes an object sensor S1 in accordance with some embodiments. The object sensor S1 is associated with a corresponding object field of view 110. The object sensor S1 is operative to detect the presence of an object within its object field of view 110. As shown in FIG. 4B, the object sensor S1 includes an infrared (IR) emitter 50A, preferably comprised of one or more light emitting diodes (LEDs), for emitting IR light into an IR emission field bounded by side boundary edges 51 and 52, and an IR sensor 55A for sensing return IR light within an IR detection field bounded by side boundary edges 53 and 54. The emitted IR light has its maximum intensity along an IR emission axis centrally located within the IR emission field. The return IR light has its maximum sensitivity along an IR detection axis centrally located within the IR detection field. The IR axes are inclined and cross over and intersect one another directly in front of the upright window 25V. The IR detection field intersects the IR emission field in a common area of intersection (shown by a quadrilateral area highlighted by hatched lines in FIG. 4B and having corners A, B, C, D) to define the object field of view 110 directly in front of the upright window 25V. In the illustrated bi-optical configuration, the object field of view 110 is also directly above the generally horizontal window 25H and the platform 14.

Figure 4C:
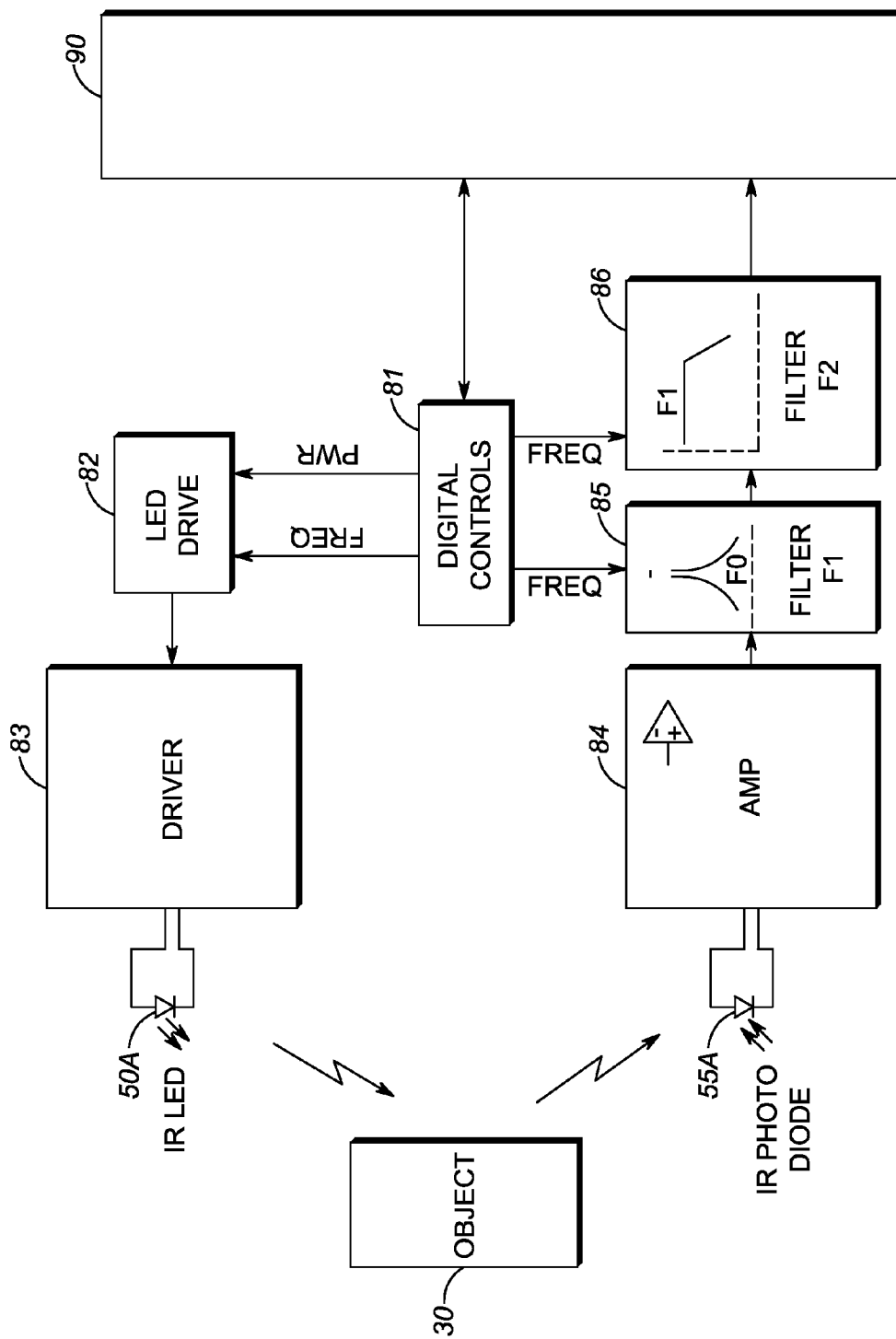
FIG. 4C is a schematic of a driving circuit for driving the object sensor S1 in accordance with some embodiments.

FIG. 4C is a schematic of a driving circuit for driving the object sensor S1 in accordance with some embodiments. In FIG. 4C, an IR LED 50A is driven by a driver 83 and LED drive 82 to emit IR light towards the target object 30. The IR light returned from the target object 30 is detected with the IR photodiode 55A. The electrical signal induced in the IR photodiode 55A by the detected IR light is amplified by the amplifier 84, filtered by the band-pass filter 85 and the low-pass filter 86, and sent to the controller 90. In some implementations, an IR LED 50A is driven with a current modulated at a predetermined frequency $f_0$, and the band-pass filter 85 allows mainly the signal at predetermined frequency $f_0$ to pass through. In some implementations, the predetermined frequency $f_0$ and the power emitted by the IR LED 50A can be controlled by the digital control 81. The cutoff frequency of the low-pass filter 86 can also be controlled by the digital control 81.

Figure 5:
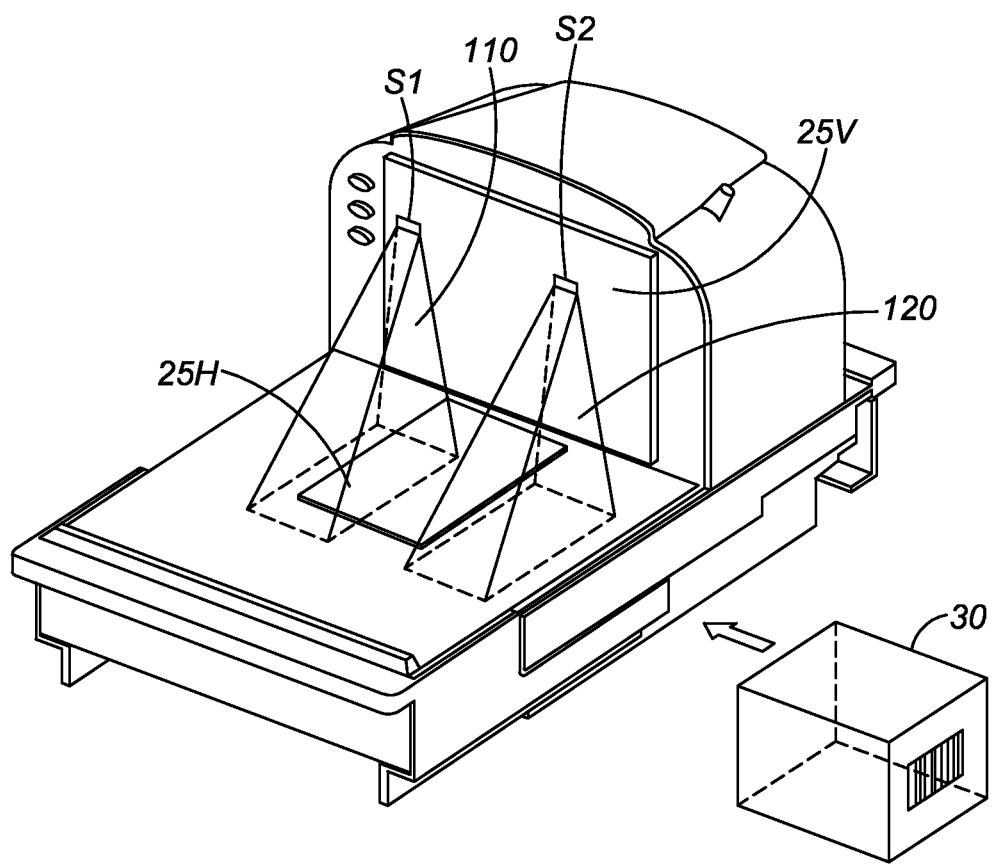
FIG. 5 depicts a workstation that includes two object sensors S1 and S2 in accordance with some embodiments.

In many workstations, multiple object sensors are implemented to provide multiple object field-of-views. FIG. 5 depicts a workstation that includes two object sensors S1 and S2 in accordance with some embodiments. Each object sensor is associated with a corresponding object field of view. Each object sensor is operative to detect the presence of an object within the corresponding object field of view of the object sensor. As shown in FIG. 5, the object sensor S1 is associated with an object field of view 110, and the object sensor S2 is associated with an object field of view 120. In some implementations, the object field of view 110 and the object field of view 120 essentially do not overlap with each other; but in other implementations, the object field of view 110 and the object field of view 120 may somewhat overlap with each other.

In some implementations, the multiple object sensors on a workstation can be implemented for determining the moving direction of the target object. For example, as shown in FIG. 5, if the object sensor S2 detects the presence of an target object 30 before the object sensor S1 detects the presence of the target object 30, then, it can be determined that this target object 30 is moving from right to left. On the other hand, if the object sensor S2 detects the presence of an target object 30 after the object sensor S1 detects the presence of the target object 30, then, it can be determined that this target object 30 is moving from left to right.

Figure 6:
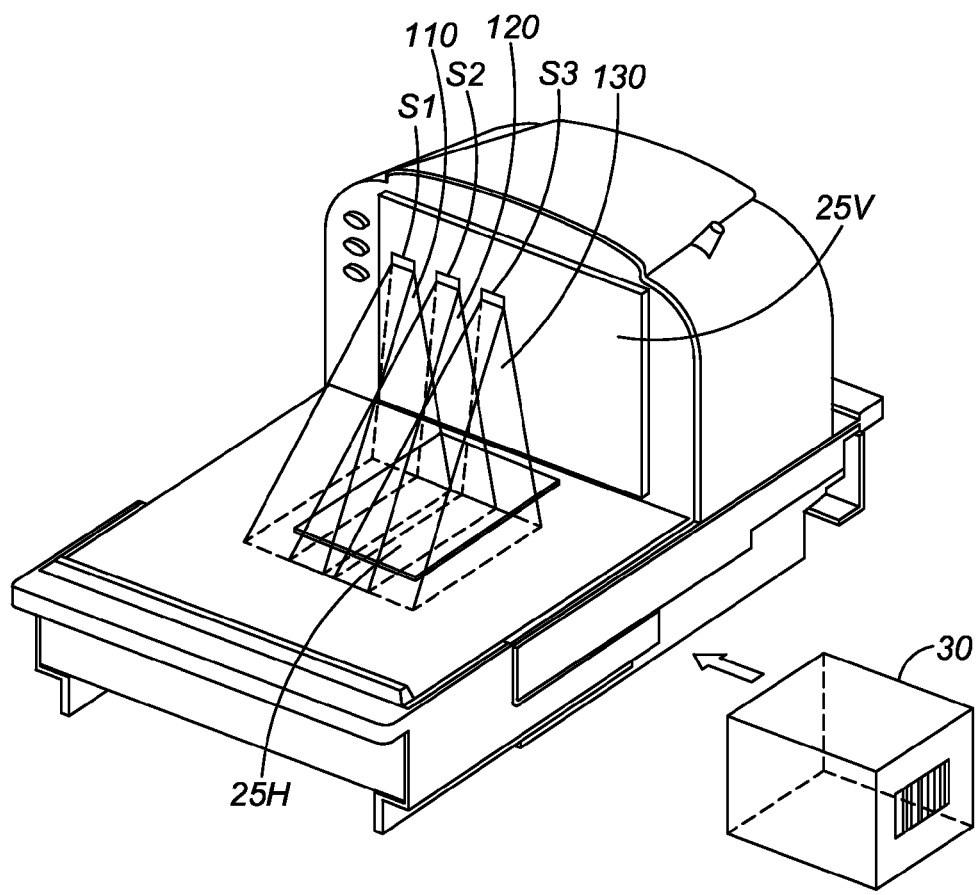
FIG. 6 depicts a workstation that includes three object sensors S1, S2, and S3 in accordance with some embodiments.

FIG. 6 depicts a workstation that includes three object sensors S1, S2, and S3 in accordance with some embodiments. Each object sensor is associated with a corresponding object field of view. Each object sensor is operative to detect the presence of an object within the corresponding object field of view of the object sensor. As shown in FIG. 6, the object sensors S1, S2, and S3 are respectively associated with object field-of-views 110, 120, and 130. In some implementations, none of object field-of-views 110, 120, and 130 overlap with others; but in other implementations, one or more of object field-of-views 110, 120, and 130 may somewhat overlap with another.

In FIG. 5 an FIG. 6, when the object field-of-views of two or more object sensors overlap with each other, the operations of these two or more object sensors can interference with each other if each of these two or more object sensors is driven independently with a driving circuit as shown in FIG. 4C. Under these circumstances, it is desirable to develop new driving circuits that can avoid such interference problem between different object sensors.

Figure 7:
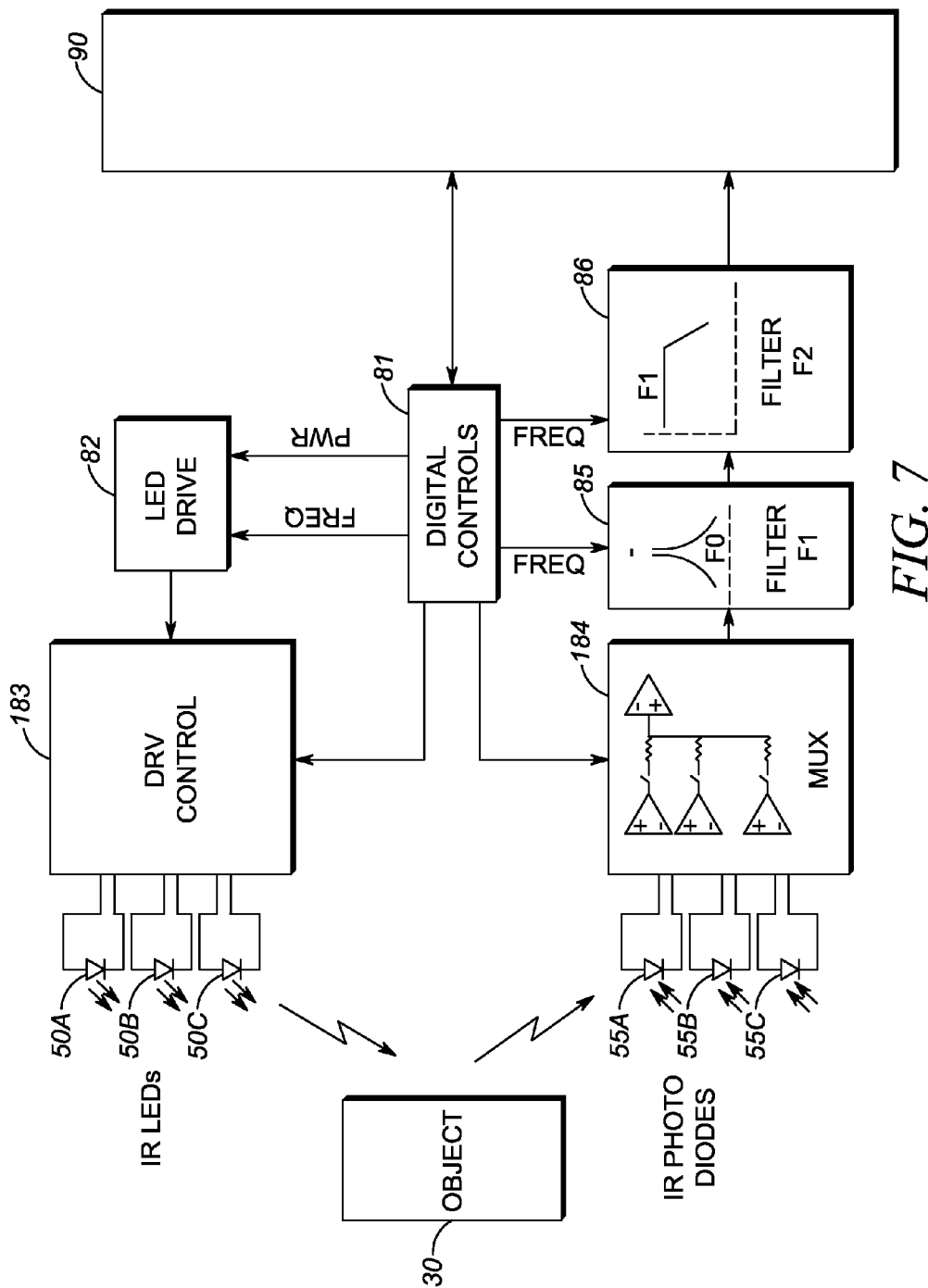
FIG. 7 is a schematic of a driving circuit for driving multiple object sensors in accordance with some embodiments.

FIG. 7 is a schematic of a driving circuit for driving multiple object sensors in accordance with some embodiments. In FIG. 7, the IR LED 50A in the object sensor S1, the IR LED 50B in the object sensor S2, and the IR LED 50C in the object sensor S3 are all connected to the driver control 183. The IR photodiode 55A in the object sensor S1, the IR photodiode 55B in the object sensor S2, and the IR photodiode 55C in the object sensor S3 are all connected to the multiplexer 184.

With the driving circuit in FIG. 7, each one of the multiple object sensors S1, S2, and S3 are activated sequentially. Generally, to activate an object sensor (e.g., S1, S2, or S3), the IR emitter (e.g., the IR LEDs 50A, 50B, or 50C) in the activated object sensor is activated by driving the IR emitter in the activated object sensor with a current, and the returned IR light caused by the IR emitter is detected with the IR sensor (e.g., the IR photodiodes 55A, 55B, or 55C) in the activated object sensor. Specifically, as shown in FIG. 7, the driver control 183 configured to activate each one of the multiple object sensors S1, S2, or S3 sequentially by driving the IR emitter in the activated object sensor with a current. For example, the IR LEDs 50A, 50B, or 50C are activated respectively by driving the activated IR LED with a current during time periods T1, T2, and T3, with the time period T2 following the time period T1 and the time period T3 following the time period T2.

In FIG. 7, the multiplexer 184 receives inputs from the IR photodiodes 55A, 55B, or 55C. The multiplexer 184 is configured to transmit a signal from the IR photodiode in the activated object sensor to an output of the multiplexer 184 while blocking signals from other IR photodiodes from transmitting to the output of the multiplexer 184. For example, when the IR LEDs 50A, 50B, and 50C are sequentially activated during time periods T1, T2, and T3 respectively, the signal from the IR photodiodes 55A, 55B, and 55C is transmitted to the output of the multiplexer 184 during time periods T1, T2, and T3 respectively. The driver control 183 and the multiplexer 184 can be controlled by the digital control 81.

In some implementations, each the IR LEDs 50A, 50B, and 50C is driven with a current modulated at a corresponding predetermined frequency. The band-pass filter 85 receives signals from the output of the multiplexer 184. The bandpass filter has its pass band covers the predetermined frequency of the modulation current, and it allows mainly the signal at predetermined frequency to pass through. In some implementations, the predetermined frequency and the power emitted by the IR LEDs can be controlled by the digital control 81. The cutoff frequency of the low-pass filter 86 can also be controlled by the digital control 81. The digital control 81 can communicate with the controller 90.

In the foregoing specification, specific embodiments have been described. However, one of ordinary skill in the art appreciates that various modifications and changes can be made without departing from the scope of the invention as set forth in the claims below. For example, while the object sensor can be implemented with an infrared light emitting diode and a photodetector, a solid-state imager can be used as the object sensor as well. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    a housing having a first window in an upright plane and a second window in a generally horizontal plane that intersects the upright plane;
    an imaging sensor within the housing and having an array of photosensitive elements;
    a proximity system including multiple object sensors each associated with an object field of view for detecting a target object outside the housing, wherein each object sensor includes an infrared (IR) emitter for emitting IR light into an IR emission field and an IR sensor for sensing returned IR light within an IR detection field that intersects the IR emission field;
    an illumination system supported by the housing and operative for illuminating the target object with illumination light;
    a controller operatively connected to the imaging sensor, the illumination system and the proximity system, for energizing the illumination system in response to detection of the target object in one of the object field of view associated with the multiple object sensors and processing the illumination light returned from the target object and being captured in a field of view associated with the imaging sensor, and operative for activating each one of the multiple object sensors sequentially wherein activating an object sensor comprises activating the IR emitter in the activated object sensor and detecting returned IR light caused by the IR emitter with the IR sensor in the activated object sensor; and a multiplexer receiving inputs from multiple IR sensors and configured to transmit a signal from the IR sensor in each one of the multiple object sensors sequentially to an output of the multiplexer while blocking signals from other IR sensors from transmitting to the output of the multiplexer.

2. The apparatus of claim 1, wherein each IR emitter includes a light emitting diode (LED).

3. The apparatus of claim 1, wherein each IR sensor includes a photodetector.

4. The apparatus of claim 1, further comprising:
a driver control configured to activate each one of the multiple object sensors sequentially by driving the IR emitter in the activated object sensor with a current.

5. The apparatus of claim 1, further comprising:
a filter receiving the signal from the output of the multiplexer.

6. An apparatus comprising:
a housing having a first window in an upright plane and a second window in a generally horizontal plane that intersects the upright plane;
an imaging sensor within the housing and having an array of photosensitive elements;
a proximity system including multiple object sensors each associated with an object field of view for detecting a target object outside the housing, wherein each object sensor includes an infrared (IR) emitter for emitting IR light into an IR emission field and an IR sensor for sensing returned IR light within an IR detection field that intersects the IR emission field;
an illumination system supported by the housing and operative for illuminating the target object with illumination light;
a controller operatively connected to the imaging sensor, the illumination system and the proximity system, for energizing the illumination system in response to detection of the target object in one of the object field of view associated with the multiple object sensors and processing the illumination light returned from the target object and being captured in a field of view associated with the imaging sensor, and operative for activating each one of the multiple object sensors sequentially wherein activating an object sensor comprises activating the IR emitter in the activated object sensor and detecting returned IR light caused by the IR emitter with the IR sensor in the activated object sensor;
a driver control configured to activate each one of the multiple object sensors sequentially by driving the IR emitter in the activated object sensor with a current; and
a multiplexer receiving inputs from multiple IR sensors and configured to transmit a signal from the IR sensor in the activated object sensor to an output of the multiplexer while blocking signals from other IR sensors from transmitting to the output of the multiplexer.

7. An apparatus comprising:
a housing having a first window in an upright plane and a second window in a generally horizontal plane that intersects the upright plane;
an imaging sensor within the housing and having an array of photosensitive elements;
a proximity system including multiple object sensors each associated with an object field of view for detecting a target object outside the housing, wherein each object sensor includes an infrared (IR) emitter for emitting IR light into an IR emission field and an IR sensor for sensing returned IR light within an IR detection field that intersects the IR emission field;
an illumination system supported by the housing and operative for illuminating the target object with illumination light;
a controller operatively connected to the imaging sensor, the illumination system and the proximity system, for energizing the illumination system in response to detection of the target object in one of the object field of view associated with the multiple object sensors and processing the illumination light returned from the target object and being captured in a field of view associated with the imaging sensor, and operative for activating each one of the multiple object sensors sequentially wherein activating an object sensor comprises activating the IR emitter in the activated object sensor and detecting returned IR light caused by the IR emitter with the IR sensor in the activated object sensor;
a driver control configured to activate each one of the multiple object sensors sequentially by driving the IR emitter in the activated object sensor with a current modulated at a predetermined frequency;
a multiplexer receiving inputs from multiple IR sensors;
a bandpass filter receiving signals from an output of the multiplexer, the bandpass filter having the pass band thereof covering the predetermined frequency of the modulation current; and
wherein the multiplexer is configured to transmit a signal from the IR sensor in the activated object sensor to the bandpass filter while blocking signals from other IR sensors from transmitting to the bandpass filter.

8. The apparatus of claim 7, further comprising:
a control circuit configured to control the driver control and the multiplexer.

9. The apparatus of claim 7, further comprising:
a control circuit configured to control the predetermined frequency of the modulation current and the pass band of the bandpass filter.

10. A method of decoding using an imaging scanner having a solid-state imager having an array of photosensitive elements, the method comprising:
detecting a target object outside a housing with a proximity system, the housing having a first window in an upright plane and a second window in a generally horizontal plane that intersects the upright plane, wherein the proximity system comprises multiple object sensors each associated with an object field of view, wherein each object sensor includes an infrared (IR) emitter for emitting IR light into an IR emission field and an IR sensor for sensing returned IR light within an IR detection field that intersects the IR emission field;
activating each one of the multiple object sensors sequentially wherein activating an object sensor comprises activating the IR emitter in the activated object sensor and detecting returned IR light caused by the IR emitter with the IR sensor in the activated object sensor;
energizing an illumination system in response to detection of the target object with one of the multiple object sensors for illuminating the target object;
capturing an image of the target object in memory by detecting light reflected from the target object with the solid-state imager; and
transmitting a signal from the IR sensor in each one of the multiple object sensors sequentially to an output of a multiplexer while blocking signals from other IR sensors from transmitting to the output of the multiplexer.

11. The method of claim 10, wherein each IR emitter includes a light emitting diode (LED).

12. The method of claim 10, wherein each IR sensor includes a photodetector.

13. The method of claim 10, further comprising:
activating each one of the multiple object sensors sequentially by driving the IR emitter in the activated object sensor with a current.

14. The method of claim 10, further comprising:
filtering the signal from the output of the multiplexer with a filter.

15. A method of decoding using an imaging scanner having a solid-state imager having an array of photosensitive elements, the method comprising:
detecting a target object outside a housing with a proximity system, the housing having a first window in an upright plane and a second window in a generally horizontal plane that intersects the upright plane, wherein the proximity system comprises multiple object sensors each associated with an object field of view, wherein each object sensor includes an infrared (IR) emitter for emitting IR light into an IR emission field and an IR sensor for sensing returned IR light within an IR detection field that intersects the IR emission field;
activating each one of the multiple object sensors sequentially wherein activating an object sensor comprises activating the IR emitter in the activated object sensor and detecting returned IR light caused by the IR emitter with the IR sensor in the activated object sensor;
energizing an illumination system in response to detection of the target object with one of the multiple object sensors for illuminating the target object;
capturing an image of the target object in memory by detecting light reflected from the target object with the solid-state imager;
activating each one of the multiple object sensors sequentially by driving the IR emitter in the activated object sensor with a current; and
transmitting a signal from the IR sensor in the activated object sensor to an output of a multiplexer while blocking signals from other IR sensors from transmitting to the output of the multiplexer.

16. A method of decoding using an imaging scanner having a solid-state imager having an array of photosensitive elements, the method comprising:
detecting a target object outside a housing with a proximity system, the housing having a first window in an upright plane and a second window in a generally horizontal plane that intersects the upright plane, wherein the proximity system comprises multiple object sensors each associated with an object field of view, wherein each object sensor includes an infrared (IR) emitter for emitting IR light into an IR emission field and an IR sensor for sensing returned IR light within an IR detection field that intersects the IR emission field;
activating each one of the multiple object sensors sequentially wherein activating an object sensor comprises activating the IR emitter in the activated object sensor and detecting returned IR light caused by the IR emitter with the IR sensor in the activated object sensor;
energizing an illumination system in response to detection of the target object with one of the multiple object sensors for illuminating the target object;
capturing an image of the target object in memory by detecting light reflected from the target object with the solid-state imager;
activating each one of the multiple object sensors sequentially by driving the IR emitter in the activated object sensor with a current modulated at a predetermined frequency; and
transmitting a signal from the IR sensor in the activated object sensor to a bandpass filter while blocking signals from other IR sensors from transmitting to the bandpass filter, the bandpass filter having the pass band thereof covering the predetermined frequency of the modulation current.

17. The method of claim 16, wherein the object field of views of at least two object sensors are overlapping with each other.

* * * * *